United States Patent Office 3,632,602
Patented Jan. 4, 1972

3,632,602
2-(2-ARYLHYDRAZINO)-2-IMIDAZOLINES
Max Wilhelm, Allschwil, Switzerland, assignor to Ciba Corporation, New York, N.Y.
No Drawing. Filed Sept. 19, 1967, Ser. No. 668,959
Claims priority, application Switzerland, Sept. 23, 1966, 13,739/66; Aug. 16, 1967, 11,488/67
Int. Cl. C07d 49/34
U.S. Cl. 260—309.6         5 Claims

ABSTRACT OF THE DISCLOSURE

Compounds of the formula

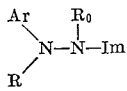

Ar=aryl radical
R=hydrocarbon radical of aliphatic character
Im=optionally substituted 2-imidazolin-2-yl radical
$R_0$=hydrogen or hydrocarbon radical of aliphatic character for example: 2-($N^2$-methyl-$N^2$-phenylhydrazino)-2-imidazoline and its salts.
Use: antihypertensives and vasoconstrictors

SUMMARY OF THE INVENTION

The present invention relates to the manufacture of new 2-(2-arylhydrazino)-2-imidazolines. Especially it concerns hydrazines containing an aryl radical and the radical R in 1-position and a 2-imidazolin-2-yl radical in 2-position, R representing a hydrocarbon radical having aliphatic characteristics which may be substituted, their salts, a process for the manufacture of these compounds and pharmaceutical compositions containing said compounds. The said compounds and pharmaceutical compositions are useful as antihypertensives and local vasoconstrictors.

DESCRIPTION OF THE PREFERRED EMBODIMENTS

The aryl radicals in the new compounds are mainly aryl radicals having at most two nuclei, for example, naphthyl radicals or especially phenyl radicals. They may be unsubstituted or carry one, two or more identical or different substituents, the said substituents being principally alkyl, alkenyl, alkoxy and alkenyloxy groups, halogen atoms and trifluoromethyl groups.

The above-mentioned alkyl groups and those mentioned hereinafter are principally lower alkyl groups, for example, methyl, ethyl, n- or isopropyl groups or the various isomers butyl or pentyl groups. Alkenyl groups are especially lower alkenyl groups, for example, allyl groups; the alkoxy groups are, in particular, lower alkoxy groups, for example, methoxy or ethoxy groups or the various isomeric propoxy, butoxy or pentoxy groups. Alkenyloxy groups are especially lower alkenyloxy groups, for example, allyloxy groups; halogen atoms are primarily fluorine, chlorine or bromine atoms.

A hydrocarbon radical having aliphatic characteristics and which may be substituted, represented by R, is, for example, an aliphatic, cycloaliphatic or araliphatic hydrocarbon radical, for example, especially an alkyl or alkenyl radical, a cycloalkyl, cycloalkenyl or cycloalkylalkyl radical which may be substituted by alkyl radicals or a phenylalkyl radical which may be substituted in the phenyl ring, as indicated above.

Cycloalkyl and cycloalkenyl radicals are, for example, cyclopropyl, cyclopentyl, cyclohexyl, cycloheptyl, cyclopentenyl or cyclohexenyl radicals.

Substituents of the hydrocarbon radicals having aliphatic characteristics R are, for example, hydroxyl groups or alkoxy groups, for example, those mentioned above.

The new compounds may be further substituted, for example, at the carbon atoms of the imidazolinyl radical by alkyl radicals, or at the secondary nitrogen atoms of the hydrazino group and the imidazolinyl radical by hydrocarbon radicals having aliphatic characteristics which may be substituted. The said radicals are those mentioned above.

The new compounds possess valuable pharmacological properties. For example, tests carried out on renalhypertensive rats show them, in particular, to have antihypertensive activity. Furthermore, tests carried out on isolated vessels from the hind extremities of rabbits show that they act as vasocontrictors. Thus, the new compounds can be used pharmacologically on animals or in medicament form as antihypertensives or local vasoconstrictors. The new compounds are also valuable intermediate products suitable for use in the preparation of other useful substances, especially pharmacologically useful compounds. They are also suitable as piloerective agents.

Compounds which are specially valuable in respect of their pharmacological properties are those of the formula

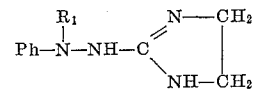

in which Ph represents a phenyl radical which may be substituted, for example, in the manner indicated above and $R_1$ represents a lower alkyl radical, and especially 2-$N^2$-methyl-$N^2$-phenylhydrazino)-2-imidaxoline of the formula

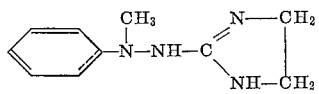

which, for example, has a pronounced hypotensive action on renalhypertensive rats when administered orally in repeated doses of 0.1 to 1.0 mg./kg./day.

The new compounds can be manufactured by known methods, for example, by condensing a salt of an S-lower alkyl isothiosemicarbazide which contains an aryl radical and the above-mentioned radical R in 1-position with a corresponding ethylenediamine which does not contain more than one substituent at its nitrogen atoms.

The reaction is carried out in the usual manner, advantageously in the presence of diluents, such as lower alkanols, if desired or required, in the presence of condensing agents, at room temperature or at an elevated temperature.

Depending on the conditions under which the process is carried out and on the kind of starting materials used, the end product is obtained in the free state or in the form of the acid addition salts thereof, which are likewise included in the invention. For example, basic, neutral or mixed salts can be obtained, and, if necessary, hemi-, mono-, sesqui- or polyhydrates thereof. The acid addition salts of the new compounds can be converted in known manner into the free compound, for example, by means of basic agents, for example, alkalis or ion exchangers. The free base obtained can form salts with organic or inorganic acids. The acids used in the preparation of acid addition salts are, in particular, therapeutically useful acids, for example, hydrohalic acid, sulfuric acid, phosphoric acids, nitric acid, perchloric acid; aliphatic, alicyclic, aromatic or heterocyclic carboxylic or sulfonic acids, for example, formic acid, acetic acid, propionic acid, succinic acid, glycolic acid, lactic acid, malic acid, tartaric acid, citric acid, ascorbic acid, maleic acid, hydroxymaleic acid or pyruvic acid; phenylacetic acid, benzoic acid, para-amino-benzoic acid, anthranilic acid, para-hydroxy-benzoic acid, salicyclic acid or para-amino-salicyclic acid, methylene-bis-(2-hydroxynaphthoic acid-3), methanesulfonic acid, ethanesulfonic acid, hydroxyethanesulfonic acid, ethylenesulfonic acid; halogen-benzenesulfonic acid, toluenesulfonic acid, naphthalene sulfonic acid; methionine, tryptophan, lysine or arginine.

These or other salts of the new compounds, for example, picrates, can also be used in the purification of the free compounds obtained in that the free compound is converted into salts, the salts are separated and the free compound is liberated from the salts.

In view of the close relationship between the free compounds and the compounds in the form of their salts, whenever a free base is referred to in this context, a corresponding salt is also intended, provided such as possible or appropriate under the circumstances.

The invention also relates to any modification of the process in which an intermediate product obtainable at any stage thereof is used as starting material and any remaining steps are carried out, or the process is discontinued at any stage thereof, or in which a starting material is formed under the reaction conditions, or in which a reactant may be used in the form of their salts.

Those compounds which are not mentioned in the literature can be made by known methods.

In the reactions of the invention, the starting materials chosen are preferably those which yield the compounds described above as being the preferred compounds.

The new compounds may be used, for example, in the form of pharmaceutical compositions which contain them in free form or in the form of a physiologically tolerable salt in admixture or conjunction with an organic or inorganic, solid or liquid pharmaceutical excipient suitable for enteral, parenteral or local administration. The said excipient must not react with the new compounds, suitable substances being, for example, water, gelatine, lactose, starch, colloidal silica, magnesium stearate, talcum, vegetable oils, benzyl alcohols, gums, polyalkylene glycols, cholesterol or other known pharmaceutical excipients. The pharmaceutical preparations may be in the form of tablets, coated tablets, pills, capsules, suppositories, salves, creams, or in the form of solutions (e.g. as elixers or syrups), suspensions or emulsions. If necessary, they may be sterilized and/or contain adjuvants, for example, preservatives, stabilizing agents, wetting agents or emulsifying agents, salts for regulating osmotic pressure or buffers. They may also contain other therapeutically useful substances. The pharmaceutical preparations are made by known methods. In the same way, the new compounds may be presented in the forms generally used in the application of piloerectors, e.g. as lotions.

The following examples illustrate the invention.

Example 1

30.0 grams of $N^1$-phenyl-$N^1$-methyl-S-methyl-isothiosemicarbazide-hydroiodide are boiled for 4 hours under reflux in 100 ml. of ethanol together with 15 grams of ethylenediamine. The batch is evaporated in a water-jet vacuum, the residue is dissolved in 2 N sodium hydroxide solution and the solution is filtered. The filtrate is rendered alkaline by the addition of 10 N sodium hydroxide solution and is subsequently extracted with methylene chloride. After drying and evaporation of the solvent, an oil remains which is dissolved in 50 ml. of absolute ethanol; 5 ml. of 10 N hydrochloric acid in ethanol are then added. Crystallization occurs after the addition of ether. 2-($N^2$-methyl-$N^2$-phenyl-hydrazino)-2-imidazoline hydrochloride of the formula

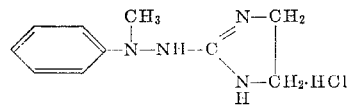

is obtained in the form of crystals which melt at 198 to 199° C. subsequent to recrystallization from isopropanol.

The $N^1$-phenyl-$N^1$-methyl-S-methyl-isothiosemicarbazide used as starting material can be obtained in the following manner:

32 grams of benzoylisothiocyanate are added dropwise to a solution of 22 grams of N-methyl-N-phenylhydrazine in 300 ml. of methylene chloride. The batch is then heated for 3 hours at 50° C. while stirring. The solution is then evaporated to half its volume, petroleum ether is added and the precipitate which is salted out is isolated by filtration. The product obtained in $N^1$-phenyl-$N^1$-methyl-$N^3$-benzoyl-thiosemicarbazide melting at 138 to 140° C.

28.5 grams of $N^1$-phenyl-$N^1$-methyl-$N^3$-benzoyl-thiosemicarbazide are heated for 30 minutes at 90° C. with 200 ml. of 10% sodium hydroxide solution while stirring. The portion which precipitates is isolated by filtration and crystallized from methanol. The product obtained is $N^1$-phenyl-$N^1$-methyl-thiosemicarbazide in the form of crystals melting at 188 to 189° C.

18.1 grams of $N^1$-phenyl-$N^1$-methyl-thiosemicarbazide are stirred for 5 hours at 50° C. in 100 ml. of ethanol together with 15.0 grams of methyl iodide. The solution is then evaporated and the residue is recrystallized from ethanol/ether. The product obtained is $N^1$-phenyl-$N^1$-methyl-S-methyl-isothiosemicarbazide in the form of crystals melting at 136 to 138° C.

Example 2

A solution containing 2-($N^2$-phenyl-$N^2$-methylhydrazino)-2-imidazoline hydrochloride can be prepared, for example from the following ingredients:

0.10 g. of 2-($N^2$-phenyl-$N^2$-methylhydrazino)-2-imidazoline hydrochloride
0.28 g. of primary sodium phosphate
0.30 g. of secondary sodium phosphate
0.70 g. of sodium chloride
0.01 g. of benzalkonium chloride
water to make up 100 ml.

The solution is suitable, for example, for nasal application.

Example 3

Tablets each containing 0.05 g. of 2-($N^2$-phenyl-$N^2$-methyl-hydrazino)-2-imidazoline hydrochloride can be prepared, for example from the following ingredients:

| | Per tablet (mg.) |
|---|---|
| 2-($N^2$-phenyl-$N^2$-methylhydrazino)-2-imidazoline hydrochloride | 0.05 |
| Wheat starch | 30.00 |
| Lactose | 50.00 |
| Colloidal silicic acid | 5.00 |
| Arrowroot | 9.45 |
| Talc | 5.00 |
| Magnesium stearate | 0.50 |
| | 100.00 |

Preparation.—The 2-($N^2$-phenyl-$N^2$-methylhydrazino)-2-imidazoline hydrochloride is mixed with part of the wheat starch, with the lactose and the colloidal silicic acid, and the mixture forced through a sieve. In a water bath, the remainder of the wheat starch is pasted with 5 times its quantity of water and the powder mixture kneaded with the resulting paste until a slightly plastic mass is obtained. This mass is forced through a sieve having a mesh width of 3 mm., dried, and the dry granulate also forced through a sieve. After that, the arrowroot, the talc and the magnesium stearate are admixed and the resulting mixture compressed into tablets each weighing 100 mg.

Example 4

In an analogous manner to that described in Example 1, there may be prepared

2-[2-(para-methoxyphenyl)-2-ethylhydrazino]-1-methyl-2-imidazoline,

2-[2-(meta-allylphenyl)-2-cyclopentyl-hydrazino]-4-methyl-2-imidazoline,

2-[2-(ortho-chlorophenyl)-2-benzyl-1-methylhydrazino]-2-imidazoline,

2-[2-(para-trifluoromethylphenyl)-2-phenethylhydrazino]-4-ethyl-2-imidazoline,

2-[2-(para-tolyl)-2-(para-methoxybenzyl)-hydrazino]-4,5-dimethyl-2-imidazoline and 2-[2-(allyloxyphenyl)-2-(meta-chlorobenzyl)-hydrazino]-4,4-dimethyl-2-imidazoline and their hydrochlorides.

I claim:

1. A member selected from the group consisting of compounds of the formula

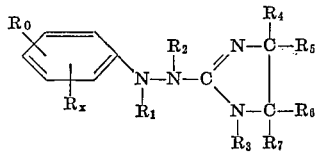

in which $R_x$ and $R_0$ each stands for a member selected from the group consisting of hydrogen, lower alkyl, lower alkenyl, lower alkoxy, lower alkenyloxy, halogen and trifluoromethyl, $R_1$ for a member selected from the group consisting of lower alkyl, cyclo-lower alkyl, phenyl-lower alkyl and phenyl-lower alkyl substituted by a member selected from the group consisting of lower alkyl, lower alkenyl, lower alkoxy, lower alkenyloxy, halogen and trifluoromethyl, $R_2$ and $R_3$ each stands for a member selected from the group consisting of hydrogen and lower alkyl, and $R_4$, $R_5$, $R_6$ and $R_7$ each stands for a member selected from the group consisting of hydrogen and lower alkyl, and their acid addition salts.

2. A product as claimed in claim 1, in which $R_1$ stands for lower alkyl, $R_2$, $R_3$, $R_4$ and $R_6$ each stands for hydrogen.

3. A product as claimed in claim 1, in which $R_1$ stands for lower alkyl and $R_2$, $R_3$, $R_4$, $R_5$, $R_6$ and $R_7$ each stands for hydrogen.

4. A product as claimed in claim 1, in which $R_1$ stands for lower alkyl and $R_0$, $R_x$, $R_2$, $R_3$, $R_4$, $R_5$, $R_6$ and $R_7$ each stands for hydrogen.

5. A product as claimed in claim 1, which product is the 2-(2-methyl-2-phenyl-hydrazino)-2-imidazoline or an acid addition salt thereof.

References Cited

UNITED STATES PATENTS

| | | | |
|---|---|---|---|
| 2,868,802 | 1/1959 | Hueni | 260—309.6 |
| 2,915,431 | 12/1959 | Carron et al. | 260—309.6 |
| 2,938,038 | 5/1960 | Hirt | 260—309.6 |
| 3,190,802 | 6/1965 | Zeile et al. | 260—309.6 |
| 3,288,805 | 11/1966 | Berg | 260—309.6 |
| 3,300,511 | 1/1967 | Zeile et al. | 260—309.6 |
| 3,480,630 | 11/1969 | Stahle et al. | 260—309.6 |

OTHER REFERENCES

Burger: Medicinal Chemistry, 2nd ed., pp. 607–8, N.Y., Interscience, 1960, RS 403.B8.

Bontempo et al.: Finland et al., Antimicrobial Agents and Chemotherapy, 1961, pp. 795–801.

Detroit, Amer. Soc. Microbiology, 1962, RS 161.A59.

Usui et al.: Jour. Pharm. Soc. (Japan), vol. 87, pp. 51, 58 and 64 relied on (January 1967) RS 1.P45.

Adcock et al.: Jour. Chem. Soc. (London), 1965, p. 478 relied on (January 1965).

NATALIE TROUSOF, Primary Examiner

U.S. Cl. X.R.

424—273